(12) United States Patent
Moell

(10) Patent No.: US 7,354,181 B2
(45) Date of Patent: Apr. 8, 2008

(54) COCKPIT MODULE

(75) Inventor: Winfried Moell, Laubach (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/602,064

(22) Filed: Nov. 20, 2006

(65) Prior Publication Data

US 2007/0121313 A1    May 31, 2007

(30) Foreign Application Priority Data

Nov. 24, 2005   (DE) .................... 10 2005 056 305

(51) Int. Cl.
*F21V 33/00* (2006.01)

(52) U.S. Cl. .............. 362/471; 362/101; 362/276; 362/602

(58) Field of Classification Search ............... 362/101, 362/234, 253, 276, 318, 555, 562, 602, 612, 362/628, 634, 800, 802
See application file for complete search history.

(56) References Cited

U.S. PATENT DOCUMENTS

| 4,446,508 | A  | * | 5/1984  | Kinzie ..................... 362/602 |
| 6,139,176 | A  |   | 10/2000 | Hulse et al. |
| 6,164,805 | A  |   | 12/2000 | Hulse |
| 6,168,302 | B1 |   | 1/2001  | Hulse |
| 6,186,650 | B1 |   | 2/2001  | Hulse |
| 6,193,399 | B1 |   | 2/2001  | Hulse |
| 6,217,201 | B1 |   | 4/2001  | Hulse |
| 6,238,074 | B1 |   | 5/2001  | Hulse et al. |
| 6,241,362 | B1 | * | 6/2001  | Morrison ................... 362/101 |
| 6,244,734 | B1 |   | 6/2001  | Hulse |
| 6,260,991 | B1 |   | 7/2001  | Hulse |
| 6,554,462 | B2 |   | 4/2003  | Hulse et al. |
| 6,733,166 | B2 |   | 5/2004  | Hulse |
| 2001/0019488 | A1 |   | 9/2001 | Hulse et al. |
| 2002/0012247 | A1 |   | 1/2002 | Kamiya et al. |
| 2002/0102058 | A1 |   | 8/2002 | Hulse |
| 2003/0076672 | A1 | * | 4/2003 | Head ......................... 362/101 |
| 2005/0078481 | A1 | * | 4/2005 | Hanis et al. ............... 362/276 |
| 2006/0044800 | A1 |   | 3/2006 | Reime |

FOREIGN PATENT DOCUMENTS

| DE | 102 51 133 | 7/2004 |
| EP | 1 625 971  | 2/2006 |
| EP | 1 659 027  | 5/2006 |
| JP | 2002329753 | 11/2002 |

\* cited by examiner

*Primary Examiner*—Y. My Quach-Lee
(74) *Attorney, Agent, or Firm*—Cohen Pontani Lieberman & Pavane LLP

(57) ABSTRACT

The cockpit module of a vehicle has a cup holder which has an opening for receiving a drinking vessel, and an illumination device for illuminating the cup holder. The cockpit module also has a printed circuit board on which the illumination device is arranged. A motion sensor is preferably provided which recognizes an object approaching the opening of the cup holder and the state of occupation of the cup holder, so that the illumination device can be controlled in a definable manner as a function of the occupation and if an object approaches.

15 Claims, 1 Drawing Sheet

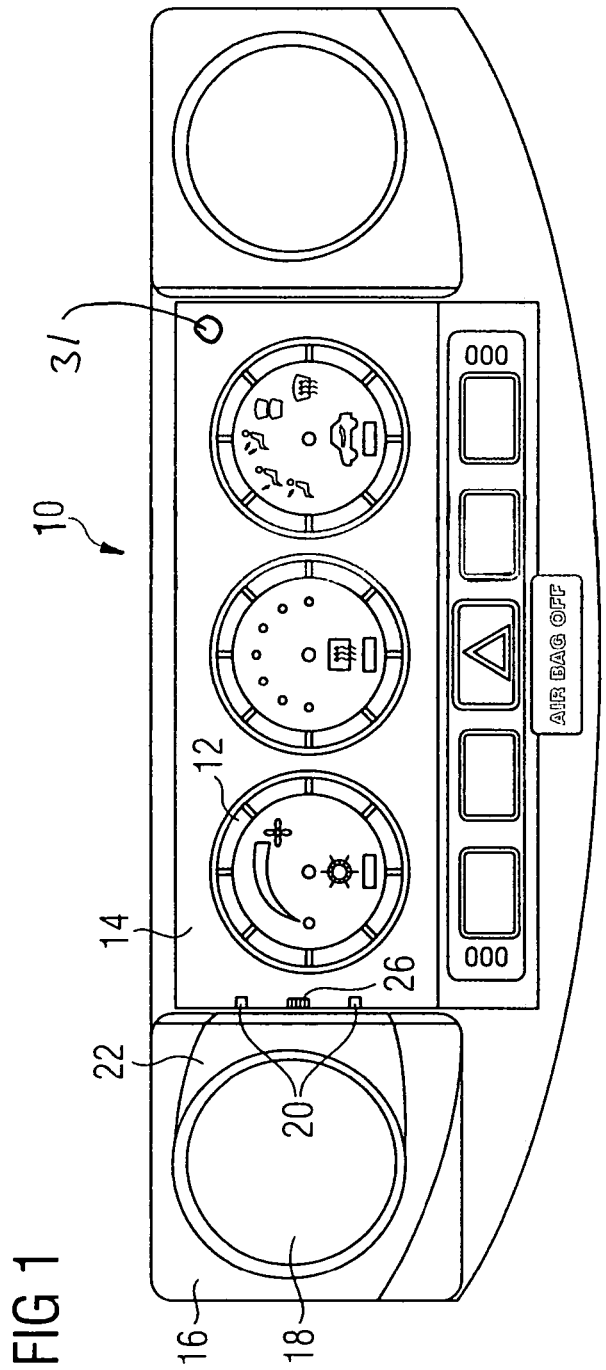
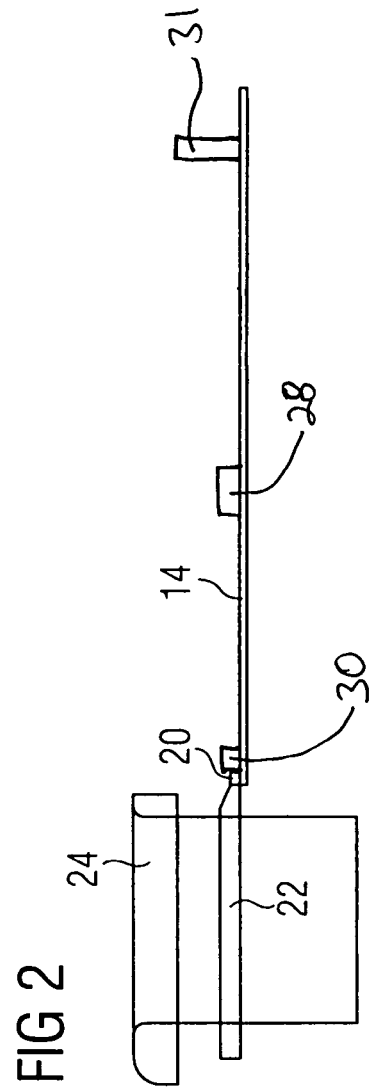

COCKPIT MODULE

BACKGROUND OF THE INVENTION

The present invention relates to a cockpit module of a vehicle, with a cup holder which has an opening for receiving a drinking vessel, and an illumination device for illuminating the cup holder.

Cup holders are used in vehicles in order to give the occupants the possibility of, on the one hand, safely storing drinking vessels and, on the other hand, having the drinking vessels easily accessible during the journey. Cup holders in which the drinking vessel is placed into an opening, so that it is held securely against slipping or tipping over, are arranged at different locations within the vehicle. A disadvantage of the known solutions is that the use of the cup holder in the dark requires increased attentiveness, since the cup holders are generally not illuminated. This is particularly because the illumination is costly, since illumination means have to be provided on the cup holder and have to be connected to the power supply of the vehicle by elaborate wiring. As an alternative thereto, cup holders can also be illuminated by a light-guiding means being laid from the illumination means as far as the cup holder. Nevertheless, the illumination means generally has to be wired up in this case too. Accordingly, in particular for cost reasons, cup holders are often entirely unilluminated or only inadequately illuminated. When the vehicle driver uses a cup holder of this type, he has to first laboriously search or even feel for the cup holder in the dark. As a result, the vehicle driver is distracted unnecessarily from the events on the road, thus putting traffic safety at risk.

SUMMARY OF THE INVENTION

It is an object of the present invention to provide a cup holder which has simple and favorable illumination.

According to a preferred embodiment of the invention, the object is achieved by a cockpit module for a motor vehicle, which has a printed circuit board and in which the illumination device is arranged on the printed circuit board.

The advantage of such cockpit module is that the illumination device for illuminating the cup holder functions without separate cables, without separate printed circuit board parts and without a costly fastening of the illumination device. This has an advantage in terms of cost over the solutions in which a separate cable run is required.

In a further preferred embodiment, a light-guiding means is provided, into which the illumination device emits light and which irradiates the light into the region of the opening. The light-guiding means is preferably planar and extends at least partially around the opening of the cup holder. Use can be made for this purpose of the transparent plastic materials which are customary for illuminating the cockpit and which guide the emitted light and irradiate it at certain locations. As a result, uniform illumination of the cup holder can be achieved. In addition, the light-guiding means can also be designed in such a manner that a drinking vessel situated in the cup holder is illuminated by the edge of the opening, so that it can be found readily in the dark.

In an expedient embodiment, the intensity of the light emitted by the illumination device can be adjusted in order to meet the individual requirements of the driver or of the vehicle occupants.

An embodiment is particularly preferred, in which a sensor is provided for recognizing the state of occupation of the cup holder, and the illumination device can be controlled via a control unit as a function of the occupation. This makes it possible to better meet the driver's needs, in which, firstly, as little amount of dazzle as possible due to the illumination of the cup holder is of primary concern and, secondly, however, the ability to find the cup holder rapidly is to be ensured.

The sensor and/or the control unit is/are preferably arranged on the printed circuit board. This makes costly wiring unnecessary, and the sensor and the control unit can be fitted, already prefabricated, on the printed circuit board, so that a separate fastening of the sensor or of the control unit is not required.

In an expedient refinement of the invention, it is provided that the illumination device emits light of a first intensity when the cup holder is unoccupied and, when the cup holder is occupied with a drinking vessel, emits light of a second intensity. If the cup holder is not occupied, i.e., if it is not used, only a weak illumination for orientation purposes is sufficient. When occupied with a drinking vessel, greater intensity of the illumination is expedient in order to be able to more rapidly find it.

In an expedient development, a control unit activates the illumination device after removal of a vessel to emit light of the second or a third intensity for a definable period of time. As a result, when the cup holder is unoccupied, the illumination light can be of low intensity, as is desirable, for example, during a journey without using the cup holder. When the cup holder is used, a second intensity with greater brightness can be set in such a manner that it does not dazzle the driver. When the vessel is removed for a drinking operation, which generally only takes place for a relatively short period of time, the illumination is maintained at the second or at the third intensity, so that the user can safely put the drinking vessel back again into the cup holder.

In a particularly user-friendly embodiment, a motion sensor is provided which recognizes an object approaching the opening of the cup holder, and, if an object approaches, the illumination device can be controlled by the control unit in a definable manner. As a result, optimum ability to find the cup holder can be achieved with, at the same time, a minimum amount of dazzle for the vehicle driver, since, for depositing a drinking vessel in the cup holder, initially only an approximate direction is required for the movement, for which purpose the cup holder has to be illuminated only relatively weakly. Only shortly before the drinking vessel is introduced into the opening does the opening have to be illuminated more intensely in order to permit the drinking vessel to be precisely deposited. The switching from one intensity to the other can take place in a stepped manner or continuously. By turning the intensity of the illumination device up and down, the vehicle safety and the user comfort can be optimized.

In a practical embodiment, the illumination device has at least one light-emitting diode (LED) which is arranged on the printed circuit board, since light-emitting diodes have a low power consumption with, at the same time, a very long service life. In addition, the heat-generation problem occurring in the case of bulbs is omitted. In addition, light-emitting diodes are cost-effective and need very little space. The embodiment mentioned last can also be supplemented by light-emitting diodes which emit light in different colors. The color of the illumination device can then preferably be adjusted.

In a particularly user-friendly development of the invention, the control unit controls the intensity and/or the color of the illumination device as a function of an adjustable, general illumination of the cockpit. This meets the customer's requirement, which is gaining in importance, to individualize the interior of the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is discussed below in more detail with reference to the attached drawings.

FIG. 1 is a plan view of a cockpit module with an illuminated cup holder; and

FIG. 2 is a diagrammatic sectional view through a printed circuit board of the cockpit module according to FIG. 1.

DETAILED DESCRIPTION OF THE PRESENTLY PREFERRED EMBODIMENTS

FIG. 1 is a plan view of a cockpit module 10, in which a plurality of control and operating elements 12 are arranged, for example for the air conditioning and other functions of the vehicle. The cockpit module 10 here forms a central part of a dashboard in the region of the center console of a vehicle. Below the operating and control elements 12, a printed circuit board 14 to which the operating and control elements 12 are connected and fastened is arranged behind a covering. A cup holder 16 with an opening 18 for receiving a drinking vessel 24 (FIG. 2) is arranged directly next to the region of the operating and control elements 12.

To illuminate the cup holder 16, illumination devices or lamps 20 are arranged on the printed circuit board 14. The lamps 20 are preferably light-emitting diodes (LEDs), since the latter are distinguished by a long service life, a low power consumption and by requiring very little space. The light-emitting diodes emit light into a light-guiding means 22 which extends around the opening 18 of the cup holder 16. The power supply and the fastening of the light-emitting diodes 20 take place via the printed circuit board 14, so that wiring up and a separate fastening device for the light-emitting diodes 20 is not required. To illuminate the cup holder 16, a plurality of light-emitting diodes 20 which emit light in different colors can be provided on the printed circuit board 14. For adaptability to different interior fittings of the vehicle, the intensity and the color of the emitted light can be adjusted by means of a control unit 28 which may be arranged on the printed circuit board 14 as shown in FIG. 2 or at a remote location.

The light-guiding means 22 is made of a transparent, planar material which is known from illumination of the cockpit and in which the light exits via the edges and side walls. The light-guiding means 22 irradiates the light into the region of the opening 18. Depending on the material used, the light-guiding means 22 can also be designed to receive a drinking vessel 24, thus rendering a separate receiving ring for the cup holder 16 unnecessary.

FIG. 2 diagrammatically shows a drinking vessel 24 which is deposited in the opening 18 and which bears against the edge formed by the light-guiding means 22. The light-guiding means 22 is designed in such a manner that the drinking vessel 24 is illuminated by the encircling ring in the region of the edge of the opening 18.

A sensor 30 which recognizes the occupation of the cup holder 16 by a drinking vessel 24 is arranged on the printed circuit board 14. The illumination device 20 can be controlled as a function of the occupation by means of the control unit 28 which is also preferably arranged on the printed circuit board 14. It is provided that the illumination device 20 emits light of a first intensity when the cup holder 16 is unoccupied and, when the cup holder 16 is occupied with the drinking vessel 24, emits light of a second intensity. For improved user convenience, after removal of the drinking vessel 24 the illumination device 20 emits light of the second or a third intensity for a definable period of time. In addition, a motion sensor 26 (FIG. 1) is provided which recognizes an object approaching the opening 18 of the cup holder 16. If an object approaches, the illumination device 20 can be controlled by the control unit 28 in a definable manner. The motion sensor 26 can be designed to also function as the sensor 30 for recognizing the occupation of the cup holder 16.

By arranging the electronic components 20, 26, 28, 30 on a printed circuit board 14, means of wiring up the lamps 20 are not required. Apart from the holes in the printed circuit board 14 for the connection of the lamps 20, i.e., for the connection of the LEDs, no additional holding devices are necessary. The connection and the installation of the LEDs 20 on the printed circuit board 14 take place in one operation, for example by soldering. In contrast to known cup holders which are used as an independent module in the interior of a vehicle, the cup holder 16 and the electronic components 20, 26, 28, 30, which are premounted on the printed circuit board 14, are inserted as a combination into other modules, for example the cockpit module. This provides a cup holder 16 with simple and favorable illumination. The user convenience is optimized by the provision of the motion sensor 26 and the control unit 28 for controlling the illumination device 20. This contributes substantially to the vehicle safety, since the driver is not distracted unnecessarily from the events on the road.

In principle, the cup holder 16 is suitable wherever modules are used in which printed circuit boards 14 are situated in the vicinity of a surface, for example even in doors.

In one embodiment, a light sensor 31 sends electric signals to the control unit 28 based on the illumination of the cockpit. The control unit 28 is programmed to control the intensity or color of the illumination device 20 based on the illumination of the cockpit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A cockpit module of a vehicle, comprising:
cockpit operating and control elements;
a cup holder defining an opening for receiving a drinking vessel;
an illumination device for illuminating the cup holder;
a printed circuit board arranged proximate the cupholder, the cockpit operating and control elements and the illumination device being arranged on the printed circuit board; and
a control unit and a sensor for recognizing a state of occupation of the cup holder, the illumination device being controllable by the control unit as a function of the state of occupation of the cup holder, the control unit being designed to control an intensity of the light emitted by the illumination device in response to a signal received from a light sensor that senses the illumination of a cockpit.

2. The cockpit module of claim 1, further comprising a light-guiding means, into which the illumination device emits light and which irradiates the light proximate the opening.

3. The cockpit module of claim 2, wherein the light-guiding means is planar and extends at least partially around the opening of the cup holder.

4. The cockpit module of claim 1, wherein the illumination device is adjustable to emit light of different intensities.

5. The cockpit module of claim 1, wherein the sensor is arranged on the printed circuit board.

6. The cockpit module of claim 1, wherein the control unit is arranged on the printed circuit board.

7. The cockpit module of claim 1, wherein the illumination device comprises at least one light-emitting diode arranged on the printed circuit board.

8. The cockpit module of claim 1, wherein the illumination device is adjustable to emit light of different colors.

9. A cockpit module of a vehicle, comprising:
cockpit operating and control elements;
a cup holder defining an opening for receiving a drinking vessel;
an illumination device for illuminating the cup holder;
a printed circuit board arranged proximate the cupholder, the cockpit operating and control elements and the illumination device being arranged on the printed circuit board; and
a control unit and a sensor for recognizing a state of occupation of the cup holder, the illumination device being controllable by the control unit as a function of the state of occupation of the cup holder, wherein the illumination device is controllable to emit light of a first intensity, when the cup holder is unoccupied, and to emit light of a second intensity, when the cup holder is occupied.

10. The cockpit module of claim 9, wherein the control unit is designed to activate the illumination device to emit light of the second or a third intensity after removal of the drinking vessel from the cup holder for a definable period of time.

11. A cockpit module of a vehicle, comprising:
cockpit operating and control elements;
a cup holder defining an opening for receiving a drinking vessel;
an illumination device for illuminating the cup holder;
a printed circuit board arranged proximate the cupholder, the cockpit operating and control elements and the illumination device being arranged on the printed circuit board;
a control unit and a sensor for recognizing a state of occupation of the cup holder, the illumination device being controllable by the control unit as a function of the state of occupation of the cup holder; and
a motion senor which is designed to recognize an object approaching the opening of the cup holder, wherein the control unit activates the illumination device in a definable manner, if the motion sensor recognizes the object approaching the opening of the cup holder.

12. The cockpit module of claim 7, wherein the illumination device comprises a plurality of light-emitting diodes which emit light of different colors.

13. A cockpit module of a vehicle, comprising:
cockpit operating and control elements;
a cup holder defining an opening for receiving a drinking vessel;
an illumination device for illuminating the cup holder;
a printed circuit board arranged proximate the cupholder, the cockpit operating and control elements and the illumination device being arranged on the printed circuit board; and
a control unit and a sensor for recognizing a state of occupation of the cup holder, the illumination device being controllable by the control unit as a function of the state of occupation of the cup holder, wherein the control unit is designed to control a color of the light emitted by the illumination device in response to a signal received from a light sensor that senses the illumination of a cockpit.

14. A cockpit module of a vehicle, comprising:
a cup holder defining an opening for receiving a drinking vessel;
an illumination device for illuminating the cup holder;
a printed circuit board arranged proximate the cupholder, the illumination device being arranged on the printed circuit board; and
a control unit and a sensor for recognizing a state of occupation of the cup holder, the illumination device being controllable by the control unit as a function of the state of occupation of the cup holder, wherein the illumination device is controllable to emit light of a first intensity, when the cup holder is unoccupied, and to emit light of a second intensity, when the cup holder is occupied.

15. A cockpit module of a vehicle, comprising:
a cup holder defining an opening for receiving a drinking vessel;
an illumination device for illuminating the cup holder;
a printed circuit board arranged proximate the cupholder, the illumination device being arranged on the printed circuit board;
a control unit and a sensor for recognizing a state of occupation of the cup holder, the illumination device being controllable by the control unit as a function of the state of occupation of the cup holder; and
a motion senor which is designed to recognize an object approaching the opening of the cup holder, wherein the control unit activates the illumination device in a definable manner, if the motion sensor recognizes the object approaching the opening of the cup holder.

* * * * *